(12) United States Patent
Nielsen et al.

(10) Patent No.: US 7,996,458 B2
(45) Date of Patent: Aug. 9, 2011

(54) ASSIGNING TASKS IN A DISTRIBUTED SYSTEM

(75) Inventors: Robert David Nielsen, Palo Alto, CA (US); Robert D. Willhoite, Campbell, CA (US); David Kramer, Portland, OR (US)

(73) Assignee: Apple Inc., Cupertino, CA (US)

( * ) Notice: Subject to any disclaimer, the term of this patent is extended or adjusted under 35 U.S.C. 154(b) by 1034 days.

(21) Appl. No.: 10/766,246

(22) Filed: Jan. 28, 2004

(65) Prior Publication Data

US 2005/0198634 A1 Sep. 8, 2005

(51) Int. Cl.
*G06F 15/16* (2006.01)
*G06F 9/46* (2006.01)

(52) U.S. Cl. ......... 709/203; 709/202; 718/103; 718/104

(58) Field of Classification Search .......... 709/201–203; 718/1, 100, 102–105
See application file for complete search history.

(56) References Cited

U.S. PATENT DOCUMENTS

| | | | | |
|---|---|---|---|---|
| 5,963,911 | A * | 10/1999 | Walker et al. | 705/7.12 |
| 6,192,388 | B1 * | 2/2001 | Cajolet | 718/100 |
| 6,373,585 | B1 * | 4/2002 | Mastie et al. | 358/1.15 |
| 6,438,553 | B1 * | 8/2002 | Yamada | 1/1 |
| 6,487,577 | B1 * | 11/2002 | Sundararajan | 718/102 |
| 6,748,414 | B1 * | 6/2004 | Bournas | 718/105 |
| 6,834,298 | B1 * | 12/2004 | Singer et al. | 709/220 |
| 6,963,897 | B1 * | 11/2005 | Hubbard | 709/201 |
| 7,062,571 | B1 * | 6/2006 | Dale et al. | 709/239 |
| 7,590,746 | B2 * | 9/2009 | Slater et al. | 709/229 |
| 2001/0025313 | A1 * | 9/2001 | Feng et al. | 709/226 |
| 2002/0007389 | A1 * | 1/2002 | Jones et al. | 709/104 |
| 2002/0029272 | A1 * | 3/2002 | Weller | 709/226 |
| 2002/0087612 | A1 * | 7/2002 | Harper et al. | 709/100 |
| 2002/0129081 | A1 * | 9/2002 | Rai et al. | 709/102 |
| 2002/0133593 | A1 * | 9/2002 | Johnson et al. | 709/226 |
| 2002/0156931 | A1 * | 10/2002 | Riedel | 709/313 |
| 2002/0169606 | A1 * | 11/2002 | Bantz et al. | 704/235 |
| 2003/0126464 | A1 * | 7/2003 | McDaniel et al. | 713/201 |
| 2003/0161327 | A1 * | 8/2003 | Vlodavsky et al. | 370/395.52 |
| 2003/0182425 | A1 * | 9/2003 | Kurakake | 709/226 |
| 2003/0195938 | A1 * | 10/2003 | Howard et al. | 709/208 |
| 2004/0098447 | A1 * | 5/2004 | Verbeke et al. | 709/201 |
| 2004/0261055 | A1 * | 12/2004 | Bertelrud et al. | 717/106 |
| 2005/0055322 | A1 * | 3/2005 | Masters et al. | 707/1 |
| 2005/0102676 | A1 * | 5/2005 | Forrester | 718/105 |
| 2005/0165921 | A1 * | 7/2005 | Abadir et al. | 709/223 |
| 2007/0011226 | A1 * | 1/2007 | Hinni et al. | 709/203 |

* cited by examiner

*Primary Examiner* — Patrice L Winder
*Assistant Examiner* — Hieu Hoang
(74) *Attorney, Agent, or Firm* — Williams, Morgan & Amerson, P.C.

(57) ABSTRACT

A method and apparatus are provided for assigning tasks in a distributed system. The method comprises indicating to one or more remote systems in the distributed system that a task is available for processing based on a list identifying the one or more remote systems. The method further comprises receiving at least one response from the one or more remote systems capable of performing the task based on the indication. The method comprises allowing at least one of the remote systems to perform the task based on the at least one received response.

36 Claims, 3 Drawing Sheets

ASSIGNING TASKS IN A DISTRIBUTED SYSTEM

BACKGROUND OF THE INVENTION

1. Field of the Invention

The invention generally relates to assigning tasks for processing in a distributed system, and, in particular, to assigning tasks for compiling in a distributed compilation system.

2. Description of the Related Art

Distributed computing has become increasingly popular with the maturation of network technology. Oftentimes, it is desirable to exploit the processing power of various networked machines that may otherwise be idle or under utilized. For example it may be desirable to use the processing power of the networked machines to compute computationally taxing tasks, such as image processing or rendering, audio processing, video processing, encrypting, decrypting, or the like.

In a typical disturbed computing environment, a central machine on a network divides a project into a number of tasks, which are assigned to one or more of the networked machines for processing or manipulation. The results are then returned to the central machine once the processing is complete. The assignment of tasks to the machines can be based on a number of criteria, including assigning the tasks in a simplistic round-robin fashion or based on some measure of predicted or historical performance (e.g., processor speed, available memory, etc.). These methods of assigning tasks can be costly in terms of overhead, and can often produce inefficient results.

Distributed systems are also employed in the context of software development. Many software development projects suffer from slow code compilation, which can result in longer "edit, compile, test" cycles, thereby extending the amount of time it takes for developers to deploy a finished software product. Whether it is a few hours wait for a full product build, or a few minutes spent several times a day for an incremental build to finish, the persistent long delays associated with compilation can result in frustration, loss of productivity, and wasted time. To expedite the compilation process, practitioners have turned to distributed compilation systems, examples of which include TeamBuilder® and distcc. These distributed compilation systems improve compilation times by sharing the compilation processing across a group of networked machines. Like in other distributed systems, distributed compilation systems, such as distcc, employ a centrally controlled client machine, which is typically the developer's workstation or laptop. A distcc client runs on the client machine, along with command line tools such as a preprocessor, a linker, and other tools employed in the software build process. Any number of "volunteer" machines assist the client to build the program, by running the compiler and assembler as required.

In conventional distributed compilation systems, the client machine schedules tasks by assigning them to the volunteer machines. In some systems, clients may delegate tasks to the volunteer machines using a simplistic circular, round-robin scheme. In other systems, a client gathers information about the operational capabilities (e.g., processor speed, availability) of the various volunteer machines, and then assigns the tasks to the volunteer machines based on the operational capability of the volunteer machine. Each of these schemes, however, has its drawbacks.

A round-robin scheme is not particularly efficient for delegating tasks because of the potential mismatch between the amount of work load that is assigned to a particular volunteer machine and its processing capabilities. For example, based on a round-robin scheme, a client machine may delegate a task to a slower, less capable volunteer machine instead of another faster volunteer machine, simply because the slower machine is next in line to receive the task. Similarly, the client machine may routinely delegate a task to a volunteer machine that is presently overloaded over an under-utilized volunteer machine based simply on the relative positions of the two volunteer machines in the round-robin scheme.

Like the round-robin schemes, schemes in which the client first gathers information about the various volunteer machines before work is assigned also tend to be inefficient and inflexible. This is because the client machine (or another machine that is designated to gather the information) is constantly burdened with the responsibility of ascertaining the operational capabilities of the various volunteer machines on the network and then ensuring that these operational capabilities are up-to-date. Constantly maintaining an up-to-date list of the various volunteer machines can be inefficient, particularly if some of those volunteer machines are rarely or never utilized. Thus, there is a need to efficiently delegate tasks in distributed compilation systems.

The present invention is directed to overcoming, or at least reducing, the effects of, one or more of the problems set forth above.

SUMMARY OF THE INVENTION

In one aspect of the instant invention, a method is provided for assigning tasks in a distributed system. The method comprises indicating to one or more remote systems in the distributed system that a task is available for processing based on a distribution list. The method further comprises receiving at least one response from the one or more remote systems capable of performing the task based on the indication. The method comprises allowing at least one of the remote systems to perform the task based on the at least one received response.

In another aspect of the instant invention, an apparatus is provided for assigning tasks in a distributed system. The apparatus comprises an interface that is adapted to communicate with one or more remote systems. The apparatus further comprises a control unit that is communicatively coupled to the interface, where the control unit is adapted to indicate to the one or more remote systems in the distributed system that a task is available for processing based on a list identifying the one or more remote systems, receive at least one response from the one or more remote systems capable of performing the task based on the indication, and allow at least one of the remote systems to perform the task based on the at least one received response.

In yet another aspect of the instant invention, an article comprising one or more machine-readable storage media containing instructions is provided for assigning tasks in a distributed system. The instructions, when executed, enable a processor to indicate to a plurality of remote systems in a distributed system that a task is available for processing based on a list identifying the remote systems and allow at least one of the plurality of remote systems to perform the task.

In yet another aspect of the instant invention, a distributed compilation system is provided for assigning compilation tasks. The distributed compilation system comprises one or more remote systems and a client system. The client system is adapted to indicate to the one or more remote systems that a compilation task is available for processing based on a list identifying the one or more remote systems, receive at least one response from the one or more remote systems capable of performing the compilation task based on the indication, and allow at least one of the remote systems to perform the compilation task based on the at least one received response.

In yet another aspect of the instant invention, a method is provided for assigning compilation tasks. The method comprises detecting an indication from a client system to process one or more compilation tasks, determining if a remote system is capable of processing at least one of the compilation tasks in response to detecting the indication from the client system, and processing the at least one of the compilation tasks for the client system in response to determining that the remote system is capable of processing the compilation task.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
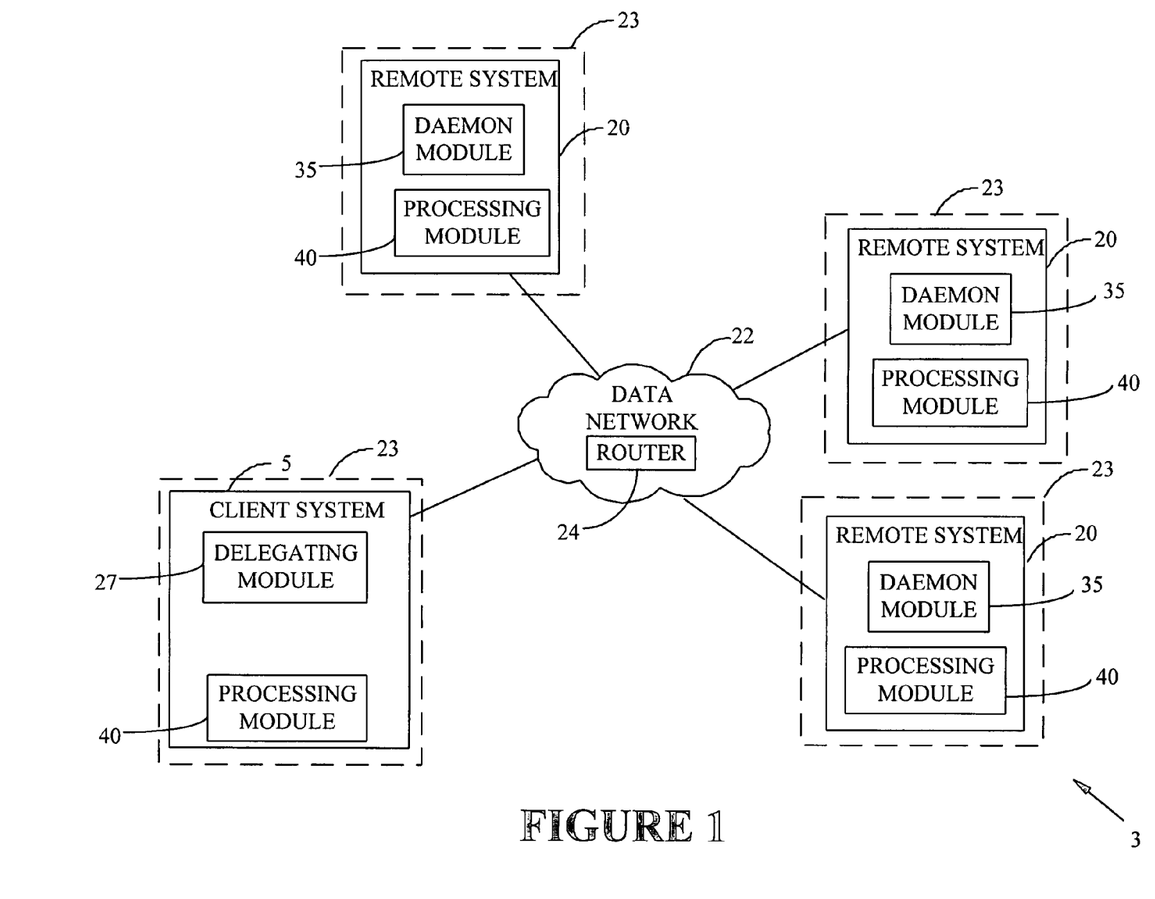
FIG. 1 is a block diagram of a distributed compilation system, in accordance with one embodiment of the present invention.

Referring to FIG. 1, a distributed system 3 includes a plurality of systems, such as a client system 5 and remote systems 20, in which tasks may be assigned to one or more of the remote systems 20 by the client system 5. For example, in one embodiment, the distributed system 3 may be a distributed compilation system in which compilation tasks may be assigned to one or more of the remote systems 20 by the client system 5. The types of tasks that are assigned to the remote systems 20 by the client system 5 may vary, depending on the implementation. Examples of tasks that may be assigned include, but are not limited to, image processing or rendering tasks, audio processing tasks, video processing tasks, encrypting tasks, decrypting tasks, compilation tasks, or other computationally intensive tasks.

As utilized herein, the term "client" refers to a system that delegates one or more tasks to other systems for completion. For ease of illustration, the system 5 is designated as the "client" in FIG. 1, although it should be appreciated that any of the remote systems 20 may also be configured as a "client" so that it is able to delegate tasks to the other remote systems 20. Thus, the roles of client and remote systems 5, 20 may vary over time in that the various systems may occasionally take on the role of client and at other times operate as a remote system. It may also be possible that, in some instances, a given system 5, 20 performs a dual role of a client system and a remote system by assigning tasks to other systems 5, 20 and, at substantially the same time, performing tasks for the other systems 5, 20.

The client system 5, in the illustrated embodiment, is coupled to the remote systems 20 over a data network 22. The systems 5 and 20 may be any processor-based systems, such as computers in the form of desktops, laptops, mainframes, personal digital assistants, or the like. In one embodiment, the systems 5, 20 may be located at various locations 23, which may be representative of different departments or centers of an organization, or, alternatively, different offices of an organization. Thus, for example, the locations 23, in one embodiment, may represent different offices/centers within a building, within one or more building complexes, within a city or country, or the like.

The data network 22 may be a public or a private network. Examples of the data network 22 may include local area networks (LANs), wide area networks (WANs), intranets, the Internet, or the like. The data network 22 may be a packet-switched data network, such as a data network according to the Internet Protocol (IP). As utilized herein, a "data network" may refer to one or more communication networks, channels, links, or paths, and systems or devices (such as routers) used to route data over such networks, channels, links, or paths. In the illustrated embodiment, at least one router 24 is shown. Although not so limited, in one embodiment, the router 24 may be utilized for the purpose of multicasting, as described later.

As described in greater detail below, in accordance with one embodiment of the present invention, the process of delegating (or scheduling) the tasks, such as compilation tasks, is at least partially shifted to (or shared with) the remote systems 20. In general, the client system 5 makes the remote systems 20 on the data network 22 aware of any task(s) requiring completion, and then receives responses from one or more of the remote systems 20 based on the capability and/or availability of that remote system 20. In this manner, the remote systems 20 that are relatively more capable (in terms of processing power and/or availability) of processing the tasks are likely to be more responsive to the client system 5. Thus, in accordance with one embodiment, the remote systems 20 are likely to be assigned tasks commensurate with their capability even though the client system 5 may have little or no prior knowledge of the capabilities of the responding remote systems 20.

In the illustrated embodiment, the client system 5 includes a delegating module 27 that indicates to the remote systems 20 that one or more tasks require completion. In one embodiment, the delegating module 27 of the client system 5 transmits a request to one or more of the remote systems 20 on the data network 22, informing the remote systems 20 of the pending task(s). The client system 5, in one embodiment, transmits the request to a plurality of remote systems 20 substantially simultaneously.

In one embodiment, the client system 5 may multicast the request to the remote systems 20 on the data network 22. In a multicasting embodiment, the client system 5 announces to the router 24 that one or more tasks require completion. The router 24 in turn multicasts the announcement to the available nodes or remote systems 20 based on the remote systems 20 identified in a multicast group or distribution list. In one embodiment, the router 24 may dynamically update the contents of its multicast group. That is, as remote systems 20 become available or inaccessible, the router 24 updates its multicast group accordingly. In one embodiment, the multicast group or distribution list may contain destination addresses associated with each of the remote systems 20 included in the group or list. The router 24, in one embodiment, may substantially simultaneously indicate to the available remote systems 20 regarding the availability of task(s). In one embodiment, the router 24 may multicast the task notification to each of the available remote systems 20 using an efficient routing path.

If a particular node or remote system 20 can perform at least one task received in a multicast message, then, in one embodiment, that remote system 20 reserves one or more of its resources (discussed below), establishes a connection with the client system 5 to inform the client system 5 that it has the capability to perform the task, and awaits for the task to be assigned by the client system 5. The connection established between the responding remote system 20 and the client system 5 may, in one embodiment, be a unicast connection. The remote system 20 may perform the task, once it has been assigned, and thereafter provide the result(s) to the client system 5. In one embodiment, a multicast comprises sending a request to all subscribed members on a list. It may be desirable to use the multicast feature to announce the availability of task(s) to remote systems 20 because, in a multicast, the router 24 typically calculates, among other things, optimal paths for transmission, which in turn can reduce network usage.

In the illustrated embodiment of FIG. 1, the remote systems 20 include a daemon module 35, which executes on the remote systems 20, and responds to requests from the client system 5. For example, the daemon module 35 accepts compilation tasks from the client system 5, processes the tasks, and provides the compilation results to the client system 5. Although not shown, in one embodiment, the client system 5 may also include the daemon module 35.

In the illustrated embodiment, the daemon module 35 utilizes a processing module 40 executing on the remote systems 20 to complete the tasks that are assigned to the remote systems 20. In the context of a distributed compilation system, the processing module 40 may, for example, compile one or more source files to produce object code files. Examples of "source files" may include source code files, resource files, library files, headers, frameworks, or the like. The source code files may be written in one of several software languages, such as C, C++, Objective-C, Java, Pascal, Fortran, or any other desirable computer language. If the distributed system 3 is a distributed compilation system, the processing module 40 may perform a variety of other tasks, including linking files with object code segments to produce executable files, performing pre-processing tasks, assembling files, or the like. In the illustrated embodiment, the client system 5 also includes the processing module 40.

The delegating module 27, daemon module 35, and processing module 40, in the illustrated embodiment, are implemented in software. While these modules 27, 35, and 40 are illustrated as three distinct modules for the purposes of this discussion, it should be appreciated that some or all portions of these modules may be combined or expanded into any number of module(s). The modules 27, 35, and 40 in the illustrated embodiment are executable on the systems 5, 20, each of which may be, for example, a laptop computer, a desktop computer, a mainframe computer, a handheld device, or any other processor-based system capable of executing instructions. In alternative embodiments, some or all portions of one or more of these modules 27, 35, 40 may be implemented in hardware or firmware.

For clarity, only selected components of the client system 5 and remote systems 20 are shown, although it should be appreciated that these systems 5, 20 may include other components, depending on the implementation. For example, in the context of a compilation system, the systems 5, 20 may include components such as an editor, a linker, an assembler or the like to build software applications.

Figure 2:
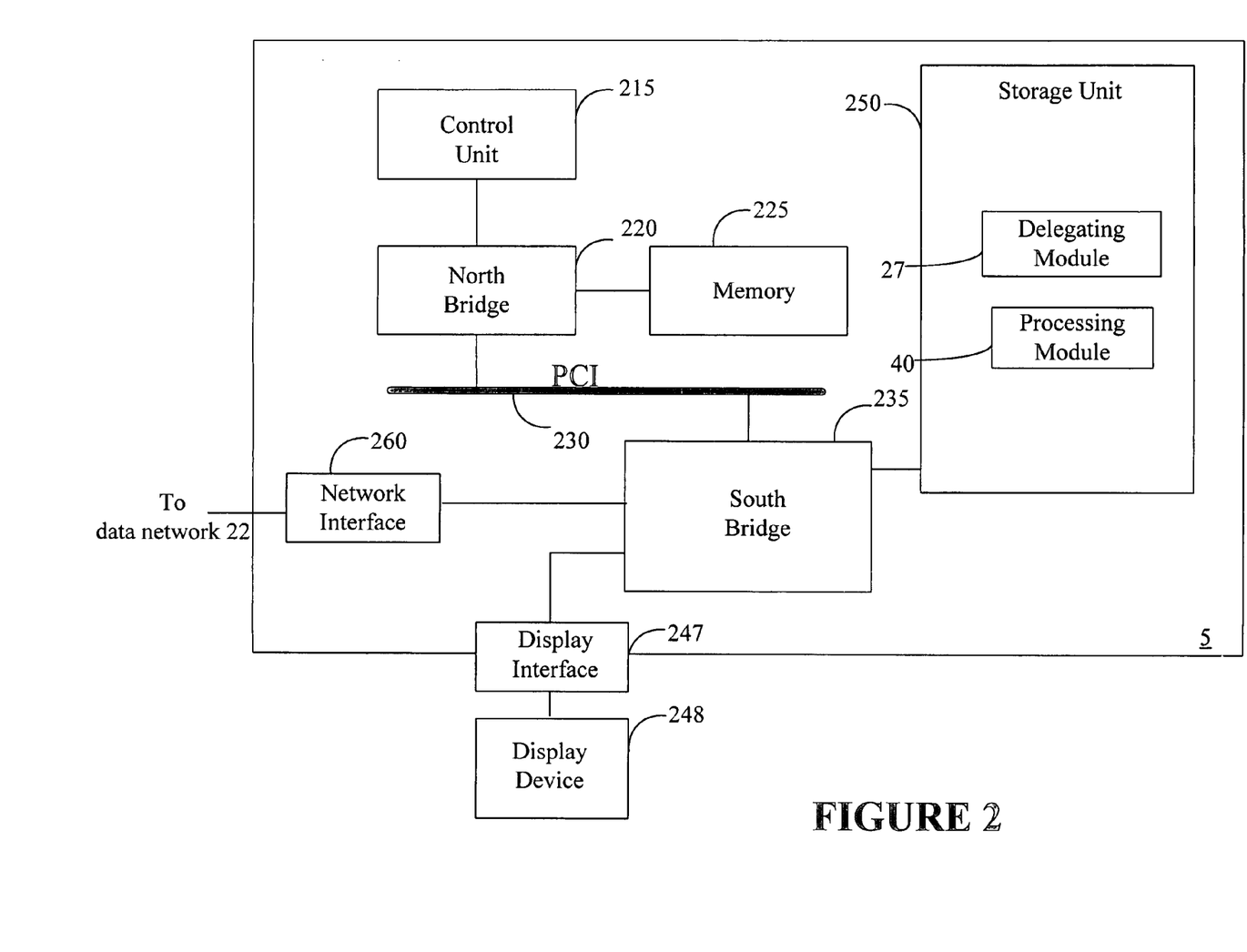
FIG. 2 is a block diagram of a client system that may be employed in the distributed compilation system of FIG. 1, in accordance with one embodiment of the present invention.

Referring now to FIG. 2, a stylized block diagram of the client system 5 of FIG. 1 is illustrated, in accordance with one embodiment of the present invention. The client system 5 comprises a control unit 215, which in one embodiment may be a processor, and is capable of interfacing with a north bridge 220. The north bridge 220 provides memory management functions for a memory 225, as well as serves as a bridge to a peripheral component interconnect (PCI) bus 230. In the illustrated embodiment, the client system 5 includes a south bridge 235 coupled to the PCI bus 230.

A storage unit 250 is coupled to the south bridge 235. The delegating module 27 and the processing module 40 are storable in the storage unit 250 and executable by the control unit 215. In one embodiment, if the client module 5 includes the daemon module 35, it may also be stored in the storage unit 250 and executed by the control unit 215. Although not shown, it should be appreciated that in one embodiment an operating system, such as Windows®, Disk Operating System®, Unix®, Linux®, MAC OS®, or the like, may be stored on the storage unit 250 and executable by the control unit 215. The storage unit 250 may also include device drivers for the various hardware components of the client system 5.

In the illustrated embodiment, the client system 5 includes a display interface 247 that is coupled to the south bridge 235. The client system 5 may display information on a display device 248 via the display interface 247. The south bridge 235 of the client system 5 may include a controller (not shown) to allow a user to input information using an input device (not shown), such as a keyboard and/or a mouse.

The south bridge 235 of the client system 5, in the illustrated embodiment, is coupled to a network interface 260, which may be adapted to receive, for example, a local area network card. In an alternative embodiment, the network interface 260 may be a Universal Serial Bus interface or an interface for wireless communications. The client system 5 communicates with the remote system 20 coupled to the data network 22 through the network interface 260.

It should be appreciated that the configuration of the client system 5 of FIG. 2 is exemplary in nature and that, in other embodiments the client system 5 may include fewer, additional, or different components without deviating from the spirit and scope of the present invention. For example, in an alternative embodiment, the client system 5 may not include a north bridge 220 or a south bridge 235, or may include only one of the two bridges 220, 235, or may combine the functionality of the two bridges. As another example, in one embodiment, the client system 5 may include more than one control unit 215. Similarly, other configurations may be employed consistent with the spirit and scope of the present invention.

In one embodiment, the remote systems 20 may include a similar configuration as the client system 5 of FIG. 2. For the remote systems 20, the daemon module 35 (see FIG. 1) may be stored in the storage unit 250 and executed by the control unit 215. The term "daemon module," as utilized herein, may refer to any software module or application that is executable by the control unit 215.

Figure 3:
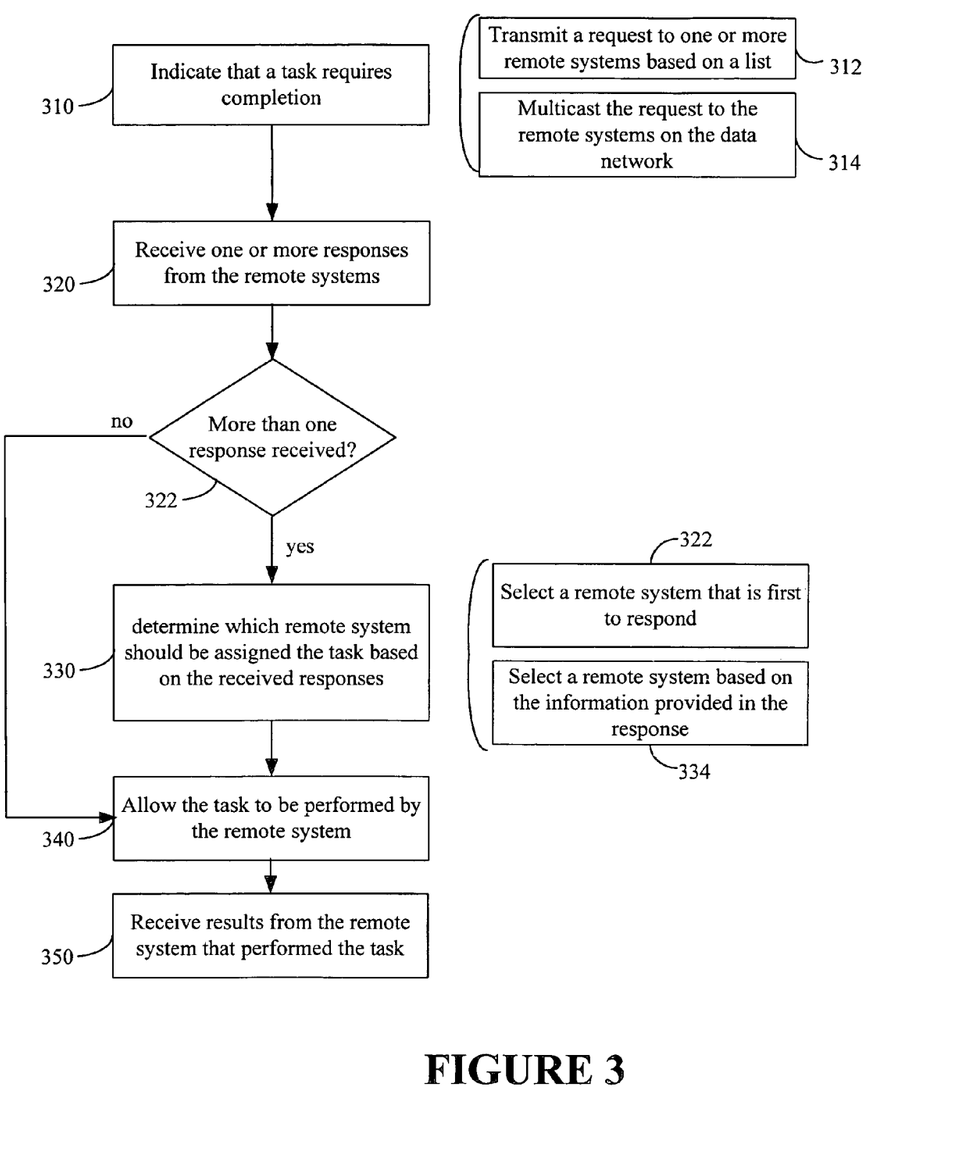
FIG. 3 is an illustration of a flow diagram performing one or more acts by a delegating module executing on the client system of FIG. 2, in accordance with one embodiment of the present invention.

Referring now to FIG. 3, a flow diagram of one or more acts that are performed by the delegating module 27 of the client system 5 is illustrated, in accordance with one embodiment of the present invention. Although, as noted, any one or more of a variety of tasks may be assigned by the delegating module 27, for illustrative purposes the flow diagram depicted in FIG. 3 is described in the context of a distributed compilation system. The delegating module 27 of the client system 5 indicates (at 310) to the remote systems 20 that a compilation task requires completion. In one embodiment, if the client system 5 has more than one task that requires completion, the client system 5 can indicate (at 310) that a plurality of compilation tasks needs processing. The one or more tasks to be performed may be posted by the client system 5, for example, in a queue, which may be accessible to the remote systems 20.

The client system 5 may indicate (at 310) to the remote systems 20 in a variety of ways that a task requires completion. For example, in one embodiment, the delegating module 27 may transmit (at 312) a request to select remote systems 20. In another embodiment, the delegating module 27 may multicast (at 314) a request to all of the various remote systems 20 coupled to the data network 22. The select remote systems 20 may be identified, for example, based on a pre-stored (or dynamically created) list of identities of remote systems 20 that is accessible to the client system 5.

In accordance with one embodiment of the present invention, the request provided (at 312 or at 314) by the client system 5 may identify the remote systems 20 that may respond to the request. That is, in one embodiment, the request from the client system 5 may specify that only those remote systems 20 satisfying a particular criterion (or criteria) may respond to the request. The criterion may be based on definitive criteria (such as hardware configuration of a remote system 20), more fluid criteria (such as the operational load of the remote system 20 at a given time), or a combination of both. As an example, the client system 5 may require that only remote systems 20 with a CPU having a minimum operating frequency of at least 2 gigahertz respond to the request. In other embodiments, the client system 5 may require that the responding remote systems 20 have memory of at least a particular size or a network adapter of a particular speed, etc. In one embodiment, the client system 5 may define the criteria based, for example, on the complexity of the task to be assigned. It should be appreciated that criteria defined to select remote systems 20 is a matter of design choice, and may vary from one implementation to another. In one embodiment, the client system 5 may not provide any criteria and may thus select one or more remote systems 20 from the remote systems 20 that respond to the request.

The request transmitted (at 312 or at 314) by the client system 5 is received by the daemon module 35 of the remote systems 20. As noted, the request may be transmitted to select remote systems 20 or multicast to all of the remote systems 20 on the data network 22. The daemon module 35, upon receiving the request, responds to the client system 5 if the remote system 20 is available to perform the compilation task. If the request that is transmitted (at 312 or at 314) by the client system 5 specifies a criterion or criteria for responding, then the daemon module 35, in one embodiment, responds only if the remote system 20 satisfies that criterion or criteria. In one embodiment, the act of responding to the client system 5 may include the remote system 20 selecting the task that requires processing from, for example, a queue in which that compilation task is posted.

In one embodiment, before responding to a request, the daemon module 35 reserves resource(s) (or locks down) of the remote system 20 to perform the task(s) for the client system 5. Reserving the resource(s) may be desirable to ensure that the remote system 20 has adequate resource(s) available to process the task(s) for the client system 5. Thus, for example, in instances where the remote system 20 may receive multiple requests from various client systems 5 in the distributed system 3, it may be desirable to ensure that the remote system 20 does not over commit its resources such that it is incapable of timely processing the task(s) for a given client system 5. Reserving a resource of the remote system 20 may include, for example, adjusting (e.g., reducing) the number of responses the remote system 20 may transmit to other client systems 5 as the remote system 20 responds to a given client system 5.

In accordance with one embodiment of the present invention, each of the responding remote systems 20 may provide information regarding its configuration or operational characteristics. For example, a responding remote system 20 may provide configuration information such as its processor speed, memory size, network card speed, or the like, to the client system 5. As another example, a responding remote system 20 may provide operational characteristic information such as its current load or the quality of the communications channel. This information may be utilized by the client system 5 to determine which remote system 20 should be assigned the compilation task in case the client system 5 receives multiple responses from the qualifying remote systems 20. Because information regarding the configuration and/or operational characteristic of the remote system 20 in one embodiment is provided by the remote system 20 itself, the client system 5 does not have to expend its resources in maintaining a database (or a repository) of the remote systems 20.

The type of configuration information or the operational characteristic information provided by the remote systems 20 may vary from implementation to another. In one embodiment, the remote systems 20 may not provide any such information while responding to the request from the client system 5.

Once the remote systems 20 respond to the request from the client system 5, these response(s) are received (at 320) by the delegating module 27 of the client system 5. The delegating module 27, in one embodiment, determines (at 322) if more than one response is received (at 320). If only a single remote system 20 responds to the request transmitted by the client system 5, then, in one embodiment, the client system 5 allows (at 340) the responding remote system 20 to perform the task. If no responses are received, then the client system 5 may perform the task itself.

If, however, it is determined (at 322) that more than one remote systems 20 responded, the delegating module 27 determines (at 330) which of the responding remote systems 20 should be assigned the task. In one embodiment, the delegating module 27 may select a remote system 20 based on a priority (or selection) scheme. For example, in one embodiment, the delegating module 27 may select (at 322) a remote system 20 based on the order in which the response(s) were received (i.e., first-come, first-served basis). In another embodiment, the client system. 5 may select (at 334) a remote system 20 based on the information provided in the response (s). For example, if two remote systems 20 with fast processors respond, but one of the remote systems 20 has twice the memory as the other, then the client system 5 may select (at 334) the remote system 20 with a larger memory. In alternative embodiments, the client system 5 may select (at 334) the remote system 20 based on any other type of information provided in the response(s) by the remote systems 20, such as load level, operating system, or the like. In yet another embodiment, the client system 5 may select (at 334) the remote system 20 based on performance characteristics of the remote systems 20. That is, if desired, the client system 5 may maintain performance characteristics of the remote systems 20 based on the past assignments to select a particular remote system. Thus, for example, a remote system 20 having a track record of completing compilation task(s) quicker than other remote systems 20 may be selected over these other remote systems 20. The client system 5 may maintain the performance characteristics (e.g., compilation times) on a compilation project basis or on any other time interval or event basis. The delegating module 27 allows (at 340) the task to the remote system 20 that is selected (at 330) to perform the task.

In one embodiment, if multiple responses are received from the remote systems 20, the client system 5 may assign a task to the one or more of the responding remote systems 20. That is, if the client system 5 has more than one task available for processing, these tasks may be delegated, if desired, to the various remote systems 20 that respond. If the client system 5 has no task to assign to one or more of the remote systems 20 that respond, then, in one embodiment, the client system 5 provides an indication to these remote systems 20 that a task is not available for processing. Based on this indication, a remote system 20 may release any resources it may have allocated to complete the task for the client system 5.

If the client system 5 has various tasks being processed by the various remote systems 20 in the distributed system 3, the client system 5, in one embodiment, tracks the processing of these tasks. That is, the client system 5, for each task, may track which remote system 20 is processing that task. The client system 5 may also, on a periodic basis or as requested by a user, request status of the processing of the tasks from the various remote systems 20. In this manner, a user can use the client system 5 to readily track the processing state of each task being processed by the remote systems 20 of the distributed system 3.

The daemon module 35 of the remote system 20 that is allowed to process the task performs the task using the processing module 40 of that remote system 20 and provides the results to the client system 5. The client system 5 receives the results (at 350). The results in one embodiment may include one or more object code files. In another embodiment, depending on the particular task assigned, the remote system 20 may compile the source code, link the object code, and then provide the results in the form of executable files to the client system 5.

In one embodiment, if the number of responding remote systems 20 exceeds the number of available tasks, the client system 5 may assign the same task to multiple remote systems 20, and then accept the results from the first remote system 20 to provide the results. Once the results have been received from at least one of the responding remote systems 20, the client system 5 may thereafter ignore the results from other remote systems 20, or, alternatively, notify these remote systems 20 that the results are no longer needed.

In some instances, a particular remote system 20 that is assigned a task may not successfully complete that task for a variety of reasons, including hardware failure, for example. In one embodiment, if an assigned task is not completed successfully, the client system 5 may repost the task in a queue and announce to the other remote systems 20 that a task is available for execution. Thus, in one embodiment, a provision is made for the client system 5 to reassign a previously uncompleted task to another remote system 20. In one embodiment, the client system 5 may identify unsuccessfully completed tasks based on a timing scheme (i.e., the execution of the task may be deemed to be incomplete if the results from the remote system 20 are not received within a preselected amount of time) or based on a message exchange scheme (i.e., the client system 5 determines if the remote system 20 is responsive based on exchange of messages).

In accordance with one or more embodiments of the present invention, an efficient way of delegating tasks in a distributed system is provided. Among other things, one or more of the described embodiments may be well-suited for processor-intensive tasks and "busy", networks. The described embodiments may also provide various failsafe mechanism, such as redundant task assignment. In one embodiment, the remote systems 20 assist the client system 5 in performing compilation task(s). In general, the client system 5 makes the remote systems 20 on the data network 22 aware of any task(s) requiring completion, and then receives responses from one or more of the remote systems 20 based on the capability and/or availability of that remote system 20. In this manner, remote systems 20 that are relatively more capable (in terms of processing power and/or availability) of processing the tasks respond to the request from the client system 5. Thus, in one embodiment, the process of scheduling (or delegating) the compilation tasks is at least partially shifted to the remote systems 20. Moreover, in one embodiment, because each recipient of the tasks can determine the number of tasks it processes, this at least reduces the need for a centralized machine to monitor the status of the performance of the remote systems 20.

Those skilled in the art will appreciate that the various system layers, routines, or modules illustrated in the various embodiments herein may be executable control units (such as the control unit 215 (see FIG. 2)). The control unit 215 may include a microprocessor, a microcontroller, a digital signal processor, a processor card, (including one or more microprocessors or controllers), or other control or computing devices. The storage devices 250 referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit 215 causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
indicating to two or more remote systems in a distributed data processing system that a task, in a task list, is available for processing based on a distribution list, wherein the task is a compilation task and wherein an indication specifies at least one resource requirement;
receiving at least one response from each of at least two of the two or more remote systems capable of performing the task responsive to receiving the indication, wherein the at least one response is based on a determination by the two or more remote systems that the at least one resource requirement is satisfied, and wherein each of the responding remote systems has reserved at least a portion of its respective resources for performing the task based at least in part on the at least one resource requirement; and
assigning the task from the task list to a remote system of the at least two remote systems that responds first to the indication that the task is available for processing, and wherein assigning the task is performed without comparing operational capabilities of the at least two remote systems to each other.

2. The method of claim 1, wherein the distribution list comprises destination addresses associated with the two or more remote systems, wherein indicating to the two or more remote systems comprises providing a message to a router that, responsive to the message, transmits at least a portion of the message to a plurality of the remote systems based on the distribution list.

3. The method of claim 1, wherein indicating to the two or more remote systems comprises indicating a threshold criterion that the two or more remote systems should satisfy, and wherein receiving the at least one response comprises receiving the at least one response from the at least two remote systems that satisfy the threshold criterion.

4. The method of claim 3, wherein indicating the threshold criterion comprises indicating at least one of a preselected processing speed, memory size, and network speed for the one or more remote systems.

5. The method of claim 3, wherein receiving the at least one response comprises receiving configuration information associated with the at least two of the two or more remote systems, and wherein the first remote system to respond refers to at least one of a first remote system to generate a response and a first remote system to have its response received.

6. The method of claim 5, wherein receiving the configuration information comprises receiving information including at least one of a processing speed, memory size, network speed, and load level associated with the one or more remote systems.

7. The method of claim 1, wherein the distribution list is a multicast list, and wherein indicating to the two or more remote systems comprises providing a message to a router that, responsive to the message, transmits, via multicast, at least a portion of the message to a plurality of the remote systems based on the distribution list.

8. The method of claim 1, wherein the act of indicating comprises indicating that the compilation task is available for processing.

9. An article comprising one or more non-transitory machine-readable storage media containing instructions that when executed enable a processor to:

indicate to two or more remote systems in a distributed data processing system that a task in a task list is available for processing based on a distribution list identifying the remote systems, wherein the task is a compilation task and wherein the indication specifies at least one resource requirement; and
assign, based on a determination by the two or more remote systems that at least one or more of the resource requirements is satisfied, the task from the task list to a first remote system to respond to the indication that the task is available for processing, wherein the task is assigned without performing a comparison of current operational capabilities of the two or more remote systems to each other, and wherein each of the two or more remote systems has reserved at least a portion of its respective resources for performing the task based at least in part on the at least one resource requirement.

10. The article of claim 9, wherein the task is a compilation task, and wherein the instructions when executed enable the processor to allow at least two of the two or more remote systems based on a selection scheme.

11. The article of claim 10, wherein the instructions when executed enable the processor to allow that remote system which responds first to perform the task.

12. The article of claim 10, wherein the instructions when executed enable the processor to allow the remote system having a desirable past performance to perform the task, wherein past performance comprises at least one of a past completed compilation task and a project compilation basis.

13. The article of claim 10, wherein the instructions when executed enable the processor to allow two or more remote systems to perform the task in response to determining that a number of responding remote systems exceed a number of available tasks.

14. The article of claim 10, wherein the instructions when executed enable the processor to receive responses from at least one of the two or more the remote systems, wherein the response includes configuration information associated with the one or more remote systems.

15. The article of claim 9, wherein the instructions when executed enable the processor to multicast a request to the two or more remote systems coupled to a network that the task is available for processing.

16. The article of claim 9, wherein the instructions when executed enable the processor to receive results from the at least one remote system that is allowed to perform the task.

17. An apparatus, comprising:
means for indicating to two or more remote systems in a distributed data processing compilation system that a task in a task list is available for processing based on a distribution list identifying the two or more remote systems and wherein the means for indicating specifies at least one resource requirement;
means for receiving at least one response from each of the two or more remote systems capable of performing the task based on the indication, wherein the at least one response is based on a determination by the two or more remote systems that the at least one resource requirement is satisfied, and wherein each of the responding remote systems has reserved at least a portion of its respective resources for performing the task based at least in part on the at least one resource requirement; and
means for assigning the task from the task list to a first remote system of the two or more remote systems to respond to the indication that the task is available for processing, and wherein means for assigning the task comprises assigning without comparing operational capabilities of the two or more remote systems to each other.

18. An apparatus, comprising:
a memory;
an interface coupled to the memory, the interface adapted to communicate with two or more remote systems; and
a control unit communicatively coupled to the interface, the control unit adapted to: indicate to the two or more remote systems in a distributed data processing compilation system that a task in a task list is available for processing based on a distribution list identifying the two or more remote systems, wherein the indication specifies at least one resource requirement;
receive at least one response from the two or more remote systems capable of performing the task based on the indication, wherein the at least one response is based on a determination by the two or more remote systems that the at least one resource requirement is satisfied, and wherein each responding remote system has reserved at least a portion of its respective resources for performing the task based at least in part on the at least one resource requirement; and
assign the task from the task list to a first remote system to respond to the indication that the task is available for processing, wherein the task is assigned without performing a comparison of operational capabilities of the two or more remote systems to each other.

19. The apparatus of claim 18, wherein the task is a compilation task, wherein the control unit is adapted to send a multicast message to a plurality of the two or more remote systems on a network that a compilation task is available, and wherein the multicast message is sent to a multicast address on a router which in turn completes the multicast.

20. The apparatus of claim 19, wherein the control unit is adapted to indicate a threshold criterion that the two or more remote systems should satisfy and further adapted to receive the at least one response from the two or more remote systems that satisfy the threshold criterion.

21. The apparatus of claim 20, wherein the control unit is adapted to indicate at least one of a minimum processing speed, memory amount, and network speed for the one or more remote systems.

22. The apparatus of claim 20, wherein the control unit is adapted to receive configuration information associated with the two or more remote systems.

23. The apparatus of claim 22, wherein the control unit is adapted to receive information including at least one of a processing speed, memory size, network speed, and load level associated with the one or more remote systems.

24. The apparatus of claim 23, wherein the control unit is adapted to allow at least two of the two or more remote systems to perform the task based on a selection scheme.

25. The apparatus of claim 24, wherein the selection scheme comprises allowing a remote system that responds first to perform the compilation task.

26. The apparatus of claim 24, wherein the selection scheme comprises allowing a remote system to perform the compilation task based on the received configuration information.

27. The apparatus of claim 18, wherein the control unit is adapted to identify the task that is available for processing in a queue that is accessible by two or more of the remote systems.

28. A distributed compilation system, comprising:
two or more remote systems;
a client system comprising a memory, said client system being adapted to:
indicate to the two or more remote systems that a compilation task in a task list is available for processing based on a distribution list identifying the one or more remote systems, wherein the indication specifies at least one resource requirement;
receive at least one response from at least two of the two or more remote systems capable of performing the compiling task based on the indication wherein the at least one response is based on a determination by at least two of the two or more remote systems that the at least one resource requirement is satisfied, and wherein each responding remote system has reserved at least a portion of its respective resources for performing the task based at least in part on the at least one resource requirement; and
assign the task from the task list to a first remote system to respond to the indication that the task is available for processing, wherein the task is assigned without performing a comparison of operational capabilities of at least two of the two or more remote systems to each other.

29. The distributed compilation system of claim 28, wherein the client system multicasts a message to the one or more remote networks over a data network.

30. The distributed compilation system of claim 28, wherein at least one of the one or more remote systems is adapted to:
detect an indication from the client system that a compilation task is available for processing;
determine if the at least one remote system is capable of processing the compilation task; and
process the compilation task for the client system in response to determining that at least one remote system is capable of processing the compilation task.

31. A method, comprising:
detecting an indication from a client system to process one or more compilation tasks, wherein the indication specifies at least one resource requirement;
determining if a remote system of a plurality of remote systems that detects the indication is capable of processing at least one of the one or more compilation tasks in response to detecting the indication from the client system, wherein the determination takes place at the remote system;
reserving one or more resources of the remote system in response to determining that the remote system is capable of processing the at least one of the one or more compilation task, wherein the reserving takes place at the remote system;
responding first to the indication, wherein responding is performed by the remote system; and
processing the at least one compilation task for the client system in response to at least one or more of the compilation tasks from the client system being assigned to the remote system, wherein the task is assigned without performing a comparison of operational capabilities of the remote system and the plurality of remote systems.

32. The method of claim 31, wherein the indication was based on a distribution list identifying the one or more remote systems, and wherein the request from the client system was a multicast request, further comprising providing results of the processing to the client system.

33. The method of claim 31, wherein the processing comprises accessing a queue associated with the client system and determining the compilation task to process.

34. A method, comprising:

indicating to two or more remote systems in a distributed data processing system that a task in a task list is available for processing, wherein the indication specifies at least one resource requirement;

receiving at least one response from the two or more remote systems capable of performing the task responsive to receiving the indication wherein the at least one response is based on a determination by the two or more remote systems that the at least one resource requirement is satisfied, and wherein each of the responding remote systems has reserved at least a portion of its respective resources for performing the task based at least in part on the at least one resource requirement; and assigning the task from the task list to a first remote system to respond to the indication that the task is available for processing, and wherein assigning the task is performed without comparing operational capabilities of the two or more remote systems.

35. The method of claim 34, wherein the distributed system is a distributed compilation system, and wherein indicating comprises indicating to the two or more remote systems that a compilation task is available for processing, wherein the indication was based on a distribution list identifying the two or more remote systems, and wherein the request from the client system was a multicast request, and further wherein receiving the at least one response comprises receiving the at least one response from the two or more remote systems capable of performing the compilation task responsive to receiving the indication.

36. The method of claim 34, wherein the task is at least one of a compilation task, a video processing task, audio processing task, image processing task, encryption task, and decryption task.

* * * * *